United States Patent
Chai et al.

(10) Patent No.: US 11,394,237 B2
(45) Date of Patent: Jul. 19, 2022

(54) SUBSTATION ASSET MANAGEMENT METHOD AND APPARATUS BASED ON POWER SYSTEM RELIABILITY INDEX

(71) Applicant: HYOSUNG HEAVY INDUSTRIES CORPORATION, Seoul (KR)

(72) Inventors: Hui Seok Chai, Changwon-Si Gyeongsangnam-do (KR); Hwang Dong Seo, Gimhae-Si Gyeongsangnam-do (KR); Jae Ryong Jung, Gimhae-Si Gyeongsangnam-do (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/975,297

(22) PCT Filed: Jul. 10, 2019

(86) PCT No.: PCT/KR2019/008517
§ 371 (c)(1),
(2) Date: Aug. 24, 2020

(87) PCT Pub. No.: WO2020/013619
PCT Pub. Date: Jan. 16, 2020

(65) Prior Publication Data
US 2020/0403443 A1     Dec. 24, 2020

(30) Foreign Application Priority Data

Jul. 11, 2018   (KR) .......................... 10-2018-0080806

(51) Int. Cl.
*H02J 13/00*     (2006.01)
*H02J 3/00*      (2006.01)

(52) U.S. Cl.
CPC .......... *H02J 13/00002* (2020.01); *H02J 3/00* (2013.01); *H02J 2203/20* (2020.01)

(58) Field of Classification Search
CPC ..... H02J 13/00002; H02J 2203/20; H02J 3/00
See application file for complete search history.

(56) References Cited

U.S. PATENT DOCUMENTS

2004/0044499 A1 * 3/2004 House .................. H02P 29/02
                                                     702/181
2015/0302332 A1   10/2015 Wang et al.

FOREIGN PATENT DOCUMENTS

KR    10-2010-0129931 A   12/2010
KR        10-1597993 B1    2/2016
(Continued)

*Primary Examiner* — Toan M Le
*Assistant Examiner* — Xiuqin Sun
(74) *Attorney, Agent, or Firm* — Novick, Kim & Lee, PLLC; Jae Youn Kim

(57) ABSTRACT

A substation asset management method can include the steps of: determining whether to compensate a reliability model by element of the substation by comparing reliability of a reference reliability model by substation type with reliability depending on health index by element thereof generated based on state data and real-time monitoring data by element of the substation; compensating the reference reliability model by substation type and generating a unique reliability model by element of the substation as a result of the determination; evaluating system reliability and economic feasibility by maintenance scenario based on a reference system reliability model for each candidate element subject to maintenance among the elements of the substation; and drawing a maintenance scenario of the elements of the substation by using a fitness function of maintaining the substation based on the result drawn through the evaluation of the system reliability and the economic feasibility.

12 Claims, 6 Drawing Sheets

(56) References Cited

FOREIGN PATENT DOCUMENTS

KR  10-2018-0076905 A  7/2018
KR  10-2018-0076906 A  7/2018

* cited by examiner

Sensitivity of SAIFI (r)

| Checkup Type (j) Element Name (i) | Maintenance of current state (1) | Normal inspection (2) | Precise inspection (3) | Replacement (4) |
|---|---|---|---|---|
| Equipment 1 | 0 | 0.1 | 0.3 | 0.5 |
| Equipment 2 | 0 | 0.4 | 0.5 | 0.8 |
| Equipment 3 | 0 | 0.3 | 0.8 | 1.3 |

Sensitivity of ENS (s)

| Checkup Type (j) Element Name (i) | Maintenance of current state (1) | Normal inspection (2) | Precise inspection (3) | Replacement (4) |
|---|---|---|---|---|
| Equipment 1 | 0 | 15 | 15 | 120 |
| Equipment 2 | 0 | 100 | 250 | 500 |
| Equipment 3 | 0 | 50 | 120 | 350 |

Sensitivity of CIC (t)

| Checkup Type (j) Element Name (i) | Maintenance of current state (1) | Normal inspection (2) | Precise inspection (3) | Replacement (4) |
|---|---|---|---|---|
| Equipment 1 | 0 | 180 | 2000 | 10000 |
| Equipment 2 | 0 | 350 | 3000 | 15000 |
| Equipment 3 | 0 | 230 | 550 | 8500 |

Maintenance Costs (c)

| Checkup Type (j) Element Name (i) | Maintenance of current state (1) | Normal inspection (2) | Precise inspection (3) | Replacement (4) |
|---|---|---|---|---|
| Equipment 1 | 0 | 0 | 2 | 3 |
| Equipment 2 | 0 | 5 | 7 | 10 |
| Equipment 3 | 0 | 3 | 4 | 6 |

FIG. 4

| Equipment 1 | | | | Equipment 2 | | | | Equipment 3 | | | | Costs | Improvement Level |
|---|---|---|---|---|---|---|---|---|---|---|---|---|---|
| Maintenance | Normal | Precise | Replacement | Maintenance | Normal | Precise | Replacement | Maintenance | Normal | Precise | Replacement | | |
| 0 | 0 | 0 | 0 | 0 | 1 | 0 | 0 | 0 | 0 | 0 | 1 | 14 | 1679.85 |
| 0 | 0 | 1 | 0 | 0 | 0 | 1 | 0 | 0 | 0 | 0 | 1 | 15 | 1595.133 |
| 0 | 1 | 0 | 1 | 1 | 0 | 0 | 1 | 1 | 0 | 0 | 0 | 13 | 1574.567 |
| 1 | 0 | 0 | 0 | 0 | 0 | 0 | 1 | 0 | 0 | 1 | 0 | 15 | 1488.517 |
| 1 | 0 | 0 | 1 | 1 | 0 | 0 | 1 | 0 | 0 | 0 | 1 | 9 | 1453.567 |
| 0 | 1 | 0 | 0 | 0 | 0 | 1 | 0 | 0 | 0 | 0 | 0 | 14 | 1438.217 |
| 0 | 0 | 1 | 0 | 0 | 1 | 0 | 0 | 0 | 0 | 0 | 1 | 14 | 1437.2 |
| 1 | 0 | 0 | 0 | 1 | 0 | 0 | 1 | 0 | 0 | 0 | 0 | 15 | 1413.617 |
| 0 | 0 | 1 | 0 | 0 | 0 | 1 | 0 | 0 | 0 | 0 | 1 | 13 | 1386.9 |
| 0 | 0 | 0 | 1 | 0 | 1 | 0 | 0 | 0 | 1 | 0 | 0 | 13 | 1370.583 |
| 0 | 0 | 1 | 0 | 0 | 0 | 0 | 1 | 0 | 0 | 0 | 0 | 14 | 1346.483 |
| 0 | 0 | 0 | 0 | 0 | 1 | 0 | 0 | 0 | 1 | 0 | 0 | 12 | 1266.3 |
| 1 | 0 | 1 | 0 | 1 | 0 | 0 | 1 | 0 | 0 | 0 | 0 | 14 | 1255.683 |
| 1 | 0 | 0 | 0 | 1 | 0 | 0 | 1 | 0 | 0 | 0 | 1 | 12 | 1212.65 |
| 0 | 0 | 0 | 1 | 0 | 0 | 0 | 1 | 0 | 0 | 0 | 0 | 13 | 1205.383 |
| 0 | 0 | 1 | 0 | 0 | 1 | 0 | 0 | 0 | 0 | 0 | 1 | 11 | 1162.35 |
| 0 | 0 | 0 | 0 | 0 | 0 | 0 | 0 | 0 | 0 | 0 | 1 | 8 | 1145.3 |
| 0 | 1 | 0 | 1 | 1 | 0 | 0 | 1 | 0 | 1 | 0 | 0 | 12 | 1121.933 |
| 1 | 0 | 0 | 1 | 0 | 0 | 1 | 0 | 1 | 0 | 0 | 0 | 13 | 1113.65 |
| 0 | 0 | 0 | 0 | 0 | 0 | 0 | 1 | 0 | 0 | 0 | 0 | 11 | 1108.367 |
| 0 | 1 | 0 | 0 | 0 | 0 | 1 | 0 | 0 | 0 | 0 | 0 | 10 | 1058.067 |
| 1 | 0 | 1 | 0 | 1 | 0 | 0 | 0 | 0 | 0 | 1 | 1 | 13 | 1038.217 |
| 0 | 0 | 0 | 0 | 0 | 1 | 0 | 0 | 0 | 0 | 0 | 0 | 7 | 987.3667 |
| 0 | 0 | 0 | 1 | 0 | 0 | 1 | 0 | 0 | 0 | 0 | 0 | 10 | 966.3333 |

FIG. 6

SUBSTATION ASSET MANAGEMENT METHOD AND APPARATUS BASED ON POWER SYSTEM RELIABILITY INDEX

FIELD OF THE INVENTION

The present invention relates to a substation asset management method, and more particularly, to the method capable of drawing an optimal plan for managing elements of a substation based on a reliability index of a power system.

BACKGROUND OF THE INVENTION

Among power systems, a transmission system or a distribution system has a substation to raise or reduce output of a generator or voltage of such system. In addition to a transformer for raising or reducing voltage, the substation has devices or systems for centralizing or distributing power, those for controlling flow, or those for protecting and controlling its devices.

For example, in a gas circuit breaker used for a gas insulated switchgear or GIS, a gas pressure sensor for detecting gas pressure change, current and voltage detectors, etc. are installed while a transformer has a thermometer, a pressure gauge, a liquid measuring sensor, a current detector, etc. as sensors for detecting its state.

Those sensors are connected to a protective system, a measuring system, a controller, and a devices-monitoring system through cables which transmit electronic signals. Again, the protective system, the measuring system, the controller, and the devices-monitoring system are connected to a superior substation-monitoring controller through cables which transmit the electronic signals.

The substation has very complicated equipment or elements to stably supply electricity which monitors operational state of a variety of devices such as a circuit breaker installed in the substation and also provides a monitoring system to detect a failure symptom in advance to prevent such failure or recover from incurred failure in rapid response to it.

As it is difficult to identify accurate states of elements of the substation, the need for optimized techniques for asset management such as an element replacement cycle, and a maintenance plan is raised and a plan for solving such requirements is needed.

DETAILED EXPLANATION OF THE INVENTION

Technical Problems

An object of the present invention is to provide a substation asset management method capable of drawing an optimal maintenance strategy for elements of the substation based on a reliability index of the power system and an apparatus executing the method.

Another object of the present invention is to provide a method of reducing costs of managing assets of the substation through the drawn optimal maintenance strategy for the elements of the substation and securing stability of facilities of the substation and providing an apparatus for executing the method.

In addition, the other object of the present invention is to provide a substation asset management method capable of satisfying customers' requested needs of cycles of replacing facilities or elements, maintenance plans, and asset management techniques and an apparatus executing the method.

The objects of the present invention are not limited to the aforementioned objects and other objects which have not been mentioned could be clearly understood by those skilled in the art from description below.

Means of Solving the Problem

A substation asset management method in accordance with one example embodiment may comprise steps of: determining whether to compensate a reliability model by element of the substation by comparing reliability of a reference reliability model by substation type with reliability depending on health index by element thereof generated based on state data and real-time monitoring data by element of the substation; compensating the reference reliability model by substation type and generating a unique reliability model by element of the substation by using the health index by element of the substation as a result of the determination; evaluating system reliability and economic feasibility by maintenance scenario based on a pre-generated reference system reliability model for each candidate element subject to maintenance among the elements of the substation; drawing a maintenance scenario of the elements of the substation by using a fitness function of maintaining the substation based on the result drawn through the evaluation of the system reliability and the economic feasibility; and checking whether to perform maintenance and updating a unique reliability model by element of the substation while scheduling maintenance and estimating maintenance costs depending on the drawn maintenance scenario of the elements of the substation; wherein the fitness function of maintaining the substation may be based on system reliability indices, which includes sensitivity of at least two system reliability indices, and may be used to draw the sum of weighted values of sensitivity of the system reliability index, which becomes a maximum value, as an optimal solution.

In addition, the fitness function of maintaining the substation may be made under the following equation:

$$\text{maximize}\left(w_1 \sum_{i,j} r_{ij}x_{ij} + w_2 \sum_{i,j} s_{ij}x_{ij} + w_3 \sum_{i,j} t_{ij}x_{ij}\right)$$

wherein w is a weighted value for scaling a reliability index; $x_{ij}$ is whether to adopt a j-th strategy for an i-th element; $r_{ij}$ is sensitivity of a first reliability index of the j-th strategy for the i-th element; $s_{ij}$ is sensitivity of a second reliability index of the j-th strategy for the i-th element; $t_{ij}$ is sensitivity of a third reliability index of the j-th strategy for the i-th element.

At the time, the weighted value may be adjusted depending on a characteristic of a site of the substation.

Meanwhile, the step of drawing a maintenance scenario of the elements of the substation by using a fitness function of maintaining the substation based on the result drawn through the evaluation of the system reliability and the economic feasibility may be set to draw only a maintenance scenario fit for cost limitations after being applied for the maintenance.

In addition, the sum of weighted values of sensitivity of the system reliability index which becomes a maximum value may be drawn as an optimal solution in the fitness function of maintaining the substation by using dynamic programming.

Furthermore, at the step of evaluating system reliability and economic feasibility by maintenance scenario based on a pre-generated reference system reliability model for each candidate element subject to maintenance among the elements of the substation, by applying at least one of failure rate, failure recovery time, load by loading point, repair costs, recovery costs, target maintenance costs, interest rate, equipment sensitivity, and parent-child relationships between the elements of the substation to the pre-generated reference system reliability model, economic feasibility including current value and future value may be evaluated while system reliability including power outage costs, value of lost load, sensitivity by element is evaluated.

In addition, the step of evaluating system reliability and economic feasibility by maintenance scenario based on a pre-generated reference system reliability model for each candidate element subject to maintenance among the elements of the substation may include a step of selecting a candidate element subject to maintenance among the elements of the substation depending on prespecified priorities.

Meanwhile, a substation asset management apparatus in accordance with another example embodiment of the present invention may comprise: a health index-generating unit for generating a health index by element of a substation by using status data and real-time monitoring data by element of the substation; a reference reliability model-managing unit for determining whether to compensate a reference reliability model by substation type and generating a unique reliability model by element of the substation based on the reference reliability model by substation type and the health index by element of a substation; a system reliability and economic feasibility-evaluating unit for evaluating system reliability and economic feasibility by maintenance scenario based on a pre-generated reference system reliability model for each candidate element subject to maintenance selected among the elements of the substation; a maintenance plan-generating unit for drawing a maintenance scenario of the elements of the substation by using a fitness function of maintaining the substation based on the result drawn through the evaluation of the system reliability and the economic feasibility; and a maintenance plan-executing unit for checking whether to perform maintenance and updating a unique reliability model by element of the substation while scheduling maintenance and estimating maintenance costs depending on the drawn maintenance scenario of the elements thereof.

Effects of the Invention

The present invention has an advantage of being capable of drawing an optimal maintenance strategy for elements of a substation based on a reliability index of a power system.

The present invention also has an advantage of being capable of securing stability of each element of the substation as well as saving costs of managing assets of the substation through the optimal strategy drawn for the elements of the substation.

The present invention further has an advantage of being capable of satisfying customers' needs for equipment replacement cycles, maintenance plans and asset management techniques.

BRIEF DESCRIPTION OF THE DRAWINGS

FIGS. 4 through 6 are drawings for explaining detailed methods of drawing an optimal maintenance scenario for each element of the substation by using a fitness function of maintaining the substation in accordance with an example embodiment of the present invention.

DETAILED DESCRIPTION OF THE PREFERRED EMBODIMENTS

Detailed example embodiments to implement the present invention will be explained below by referring to attached drawings.

Upon explanation of the present invention, terms such as "a first," "a second," etc. may be used to explain a variety of components but the components may not be limited by such terms. The terms are used only for the purpose of distinguishing one component from another. For example, a first component may be named as a second component without being beyond the scope of the right of the present invention and similarly, even a second component may be named as a first one.

If it is mentioned that a component is connected or linked to another component, it may be understood that the component may be directly connected or linked to the another component but also a third component may exist in between them.

The terms used in this specification are used only to explain specific example embodiments and they are not intended to limit the present invention. Unless a context clearly indicates a different meaning, any reference to singular may include plural ones.

In this specification, it may be understood: that terms such as "include," or "equip" are intended to designate that features numbers, steps, movements, components, parts, or their combinations exist; and that existence or audibility of one or more other features, numbers, steps, movements, components, parts, or their combinations are not excluded in advance.

Besides, shapes, sizes, etc. of elements in drawings may be exaggerated for clearer explanation.

Figure 1:
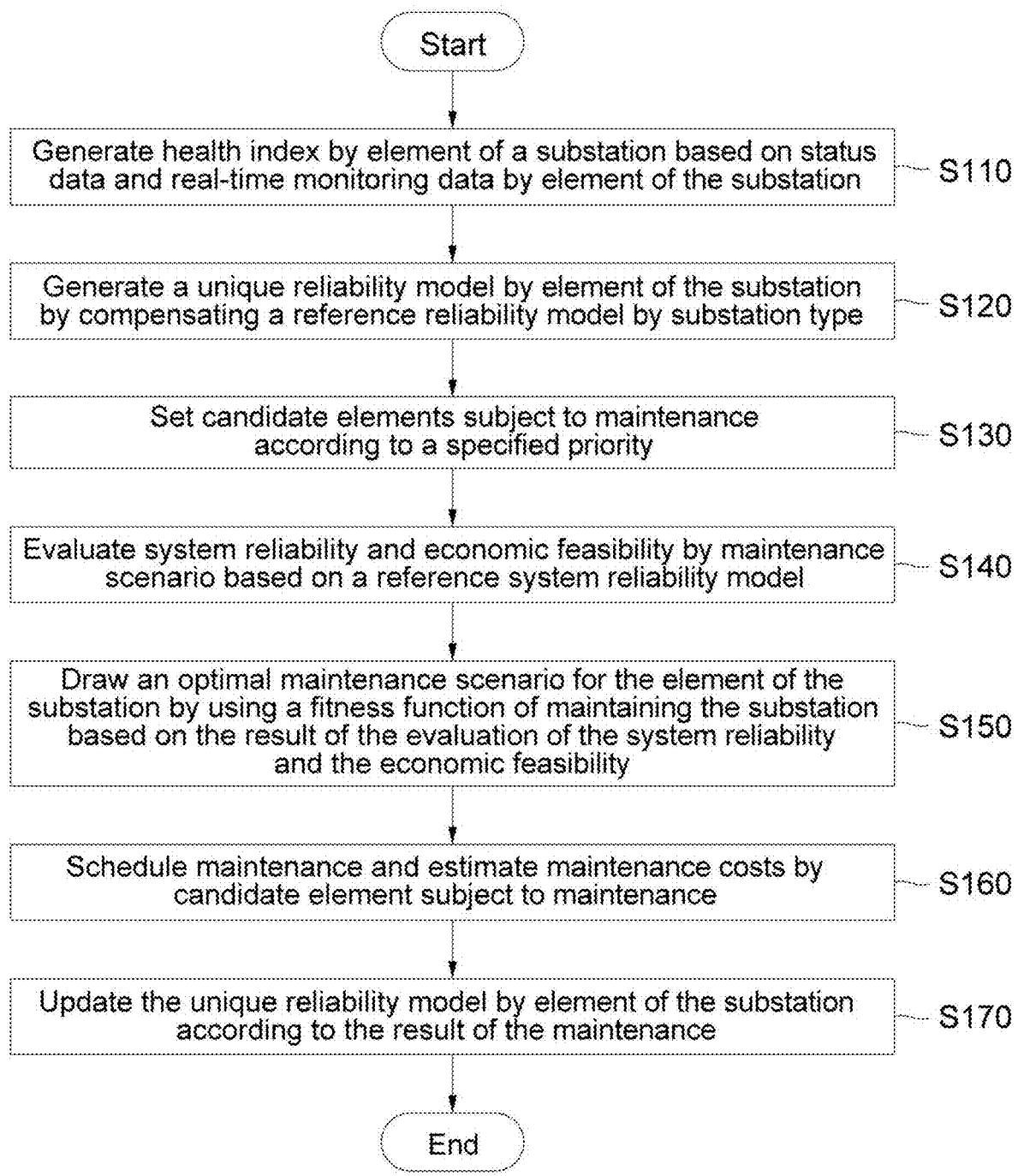
FIG. 1 is a flowchart to explain a substation asset management method in accordance with an example embodiment of the present invention.

FIG. 1 is a flowchart to explain a substation asset management method in accordance with an example embodiment of the present invention.

By referring to FIG. 1, a substation asset management apparatus in accordance with the present invention first generates a health index by element of a substation based on status data and real-time monitoring data by element of the substation at S110. At the time, the status data and the real-time monitoring data by element of the substation include online monitoring status data by element of the substation, offline monitoring status data and remote monitoring status data by element of the substation. The offline monitoring status data may include at least one of data on installation history, checkup history, failure history, operating environment, and operating history by element of the substation.

In accordance with one example embodiment of the present invention of S110, the substation asset management apparatus 100 may generate total score of, and actions against, technical risks depending on an operating environment, insulation deterioration, electrical risk, thermal risk, chemical risk, mechanical risk, airtightness performance, insulation performance, interrupting performance, and current-carrying performance by element of the substation.

For example, the substation asset management apparatus may generate total score of, and actions against, technical risks depending on an operating environment, insulation deterioration, electrical risk, thermal risk, chemical risk, and mechanical risk of a transformer, TR, by using information on a reference reliability model of the TR.

For another example, the substation asset management apparatus may generate total score of, and actions against, technical risks depending on operating history data, airtightness performance, insulation performance, interrupting performance, and current-carrying performance of a gas insulated switchgear or GIS by using a reference reliability model of the GIS.

Next, the substation asset management apparatus generates a unique reliability model by element of the substation by compensating a reference reliability model by substation type based on the reference reliability model by substation type and health index by element of the substation at S120. Herein, the reference reliability model by substation type is a generated reference reliability model by substation type based on basic information on power facilities, information on failure history, etc.

Figure 2:
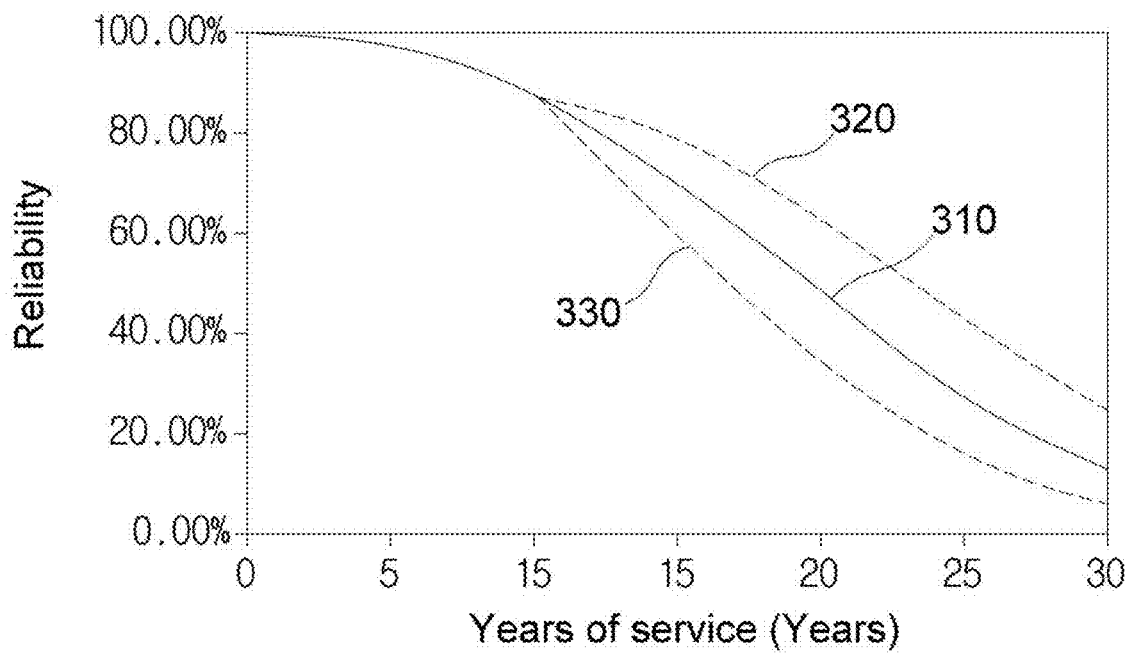
FIG. 2 is a drawing representing graphs to explain a method of compensating a reference reliability model by substation type in accordance with an example embodiment of the present invention.

FIG. 2 is a drawing representing graphs to explain a method of compensating a reference reliability model by substation type in accordance with an example embodiment of the present invention.

By referring to FIG. 2, the substation asset management apparatus determines whether to compensate the reference reliability model by substation type by comparing the reliability of the reference reliability model 310 by substation type with the reliability of graphs 320 and 330 depending on health index by element thereof generated based on state data and real-time monitoring data by element of the substation.

Herein, as explained above, the reference reliability model by substation type is generated based on data on installation and checkup history, data on analysis of obsolete and removed items, and data on accelerated life tests by element of the substation, etc.

Herein, the graph 320 represents that the reliability depending on the health index by element of the substation is higher than the reliability of the reference reliability model 310 by substation type and the graph 330 represents that the reliability depending on the health index by element of the substation is lower than the reliability of the reference reliability model 310 by substation type.

If the reliability of the reference reliability model 310 by substation type is different from the reliabilities of the graphs 320 and 330 by the generated health index by element of the substation based on the state data and the real time monitoring data by element of the substation, the substation asset management apparatus calculates a unique reliability model by element of the substation by compensating the reference reliability model by substation type.

In other words, if the reliabilities of the graphs 320 and 330 depending on the health index by element of the substation are different from the reliability of the reference reliability model 310 by substation type, the substation asset management apparatus determines that the currently used reference reliability model by substation type is not an optimal reference reliability model and compensates the reference reliability model by substation type depending on the health index by element of the substation, thereby calculating the unique reliability model by element of the substation.

Meanwhile, if the reliability depending on the generated health index by element of the substation based on the state data and the real time monitoring data by element of the substation overlaps with the reliability of the reference reliability model 310 by substation type, the substation asset management apparatus does not compensate the reference reliability model by substation type by determining that the currently used reference reliability model by substation type is optimal.

The present invention may draw an optimal unique reliability model by element of a substation through the process of compensating the reference reliability model by substation type as shown above.

Next, the substation asset management apparatus sets candidate elements subject to maintenance by a specified priority at S130. For example, if a specified priority is failure rate, the substation asset management apparatus may set candidate elements subject to maintenance with higher failure rates as the specified priority. In the above, the failure rate is set as a specified priority, but it does not have to be limited to this. Another priority may be applied depending on a characteristic of a site of the substation.

After that, the substation asset management apparatus evaluates system reliability and economic feasibility by maintenance scenario based on the pre-generated reference system reliability model for the candidate element subject to maintenance at S140.

As an implementation example of S140, the substation asset management apparatus may evaluate economic feasibility, including current value and future value, while evaluating system reliability, including power outage costs, value of lost load, sensitivity by element by applying failure rate, failure recovery time, load by loading point, repair costs, recovery costs, target maintenance costs, interest rate, equipment sensitivity, and parent-child relationships between the elements of the substation, etc. to the pre-generated reference system reliability model.

Herein, system reliability means the ability of a system: which is within a certain range of frequency and voltage without excess of the permissible capacity of catenary and other facilities; and which satisfies a specified system operation status that meets security enough to keep system stability even upon occurrence of disturbance and, at the same time, may supply power required by a customer.

Such system reliability may be calculated based on reliability indices including System Average Interruption Frequency Index (SAIFI), Energy Not Supplied Index (ENS), Customer Interruption Cost (CIC), System Average Interruption Duration Index (SAIDI), etc.

The SAIFI may be defined as a value summing up the number of elements for each loading point multiplied by the failure rate divided by the number of elements in each loading point as shown in Equation 1 below.

$$SAIFI = \frac{\text{total number of customer interruptions}}{\text{total number of customers served}} = \frac{\sum \lambda_i N_i}{\sum N_i} \quad \text{[Equation 1]}$$

where $N_i$ means the number of elements for loading point i; and $\lambda_i$ means the failure rate for loading point i.

In addition, the ENS may be defined as the sum of all loads multiplied by the sum of all the unavailability rates caused by the elements for a loading point as shown in Equation 2 below.

$$ENS = \sum_{i=1}^{n} P_i(t) \sum_{k=1}^{m} U_{i,k} \quad \text{[Equation 2]}$$

where $P_i$ is the load of loading point i; and $U_{i,k}$ means the unavailability rate caused by an element k in the loading point i.

The CIC may be defined as the sum of the financial value incurred as a result of power supply interruptions multiplied by the failure rate multiplied by all loads as shown in Equation 3 below.

$$CIC = \sum_{i=1}^{n} P_i(t) \sum_{k=1}^{m} \lambda_{i,k}(t) C(r_{i,k}) \quad \text{[Equation 3]}$$

where Pi is the load in the loading point i; $\lambda_{i,k}$ is the failure rate of an element k in the loading point i; $r_{i,k}$ means the failure recovery time of the element k in the loading point i; and C(r) means the financial value incurred for r hours.

In other words, the CIC means the financial value incurred by a serviced consumer as a result of power supply interruption and may be divided into impact cost and handling cost. The impact cost is the directly damaged cost impacted as a result of power interruption and the indirectly damaged cost influencing over the economic activities even though it is not directly related to the power interruption and the handling cost means the cost in preparation for outage as the cost prepared in advance to minimize the damage in preparation for expected supply failure (outage).

The aforementioned reliability indices indicate the impact of power outage. When the value is smaller, the system has higher reliability. For example, if the SAIFI of a system A is 3.0 and that of a system B is 2.5, the system B may be evaluated as a system with higher reliability.

In addition, the reliability indices are evaluated in a form of linear combination of the impacts of an element which has been out of order. For example, if a reference system is selected based on the SAIFI, N becomes fixed (a constant). Accordingly, the value of the SAIFI becomes a linearly combined value of the failure rate λ of an element.

In other words, on assumption that a reference system is selected; the reference system has element 1, element 2, element 3, and the other; and the failure rates of the element 1, the element 2, the element 3, and the other are 0.1, 0.2, 0.3, and 0.3, respectively, the SAIFI becomes 0.9 by summing up 0.1, 0.2, 0.3, 0.3 (i.e., 0.1+0.2+0.3+0.3).

Next, based on the result of the system reliability and the economic feasibility drawn from S140, an optimal maintenance scenario for the element of the substation is drawn by using the fitness function of maintaining the substation in the present invention at S150. At the time, as the optimal maintenance scenario for the element of the substation, only the maintenance scenario fit for cost limitations after being applied for the maintenance may be drawn.

The fitness function of maintaining the substation in accordance with the present invention is as shown Equation 4 below.

$$\text{maximize}\left(w_1 \sum_{i,j} r_{ij} x_{ij} + w_2 \sum_{i,j} s_{ij} x_{ij} + w_3 \sum_{i,j} t_{ij} x_{ij}\right) \quad \text{[Equation 4]}$$

where w is a weighted value for scaling each of reliability indices; $x_{ij}$ is whether to adopt a j-th strategy for an i-th element; $r_{ij}$ is sensitivity of a first reliability index of the j-th strategy for the i-th element; $s_{ij}$ is sensitivity of a second reliability index of the j-th strategy for the i-th element; $t_{ij}$ is sensitivity of a third reliability index of the j-th strategy for the i-th element.

At the time, the weighted value (w) is a weighted value for scaling each of reliability indices, but it may be properly adjusted in a method of increasing the weighted value of each of the reliability indices that should be handled importantly depending on a characteristic of a site of the substation.

Besides, the cost limitations for maintenance applied to the fitness function of maintaining the substation may be presented as shown in Equation 5 below.

$$\sum_{i,j} c_{ij} x_{ij} \leq c_{max} \quad \text{[Equation 5]}$$

$$\sum_{i} x_{ij} = 1$$

$$x_{ij} \in \{0, 1\},$$

i=the number of elements of the substation,
j=maintenance method where $c_{ij}$ means the cost for the j-th strategy for the i-th element; and $c_{max}$ means the upper limit of the cost.

Meanwhile, sensitivities of the reliability indices mean the level of influence over the reliability indices depending on the maintenance of an element. It is generally calculated in a method of comparing results by changing one value while the others are kept fixed.

To explain with the aforementioned example, on assumption that a reference system is selected; the reference system has element 1, element 2, element 3, and the other; and the failure rate of the element 1, the element 2, the element 3, and the other are 0.1, 0.2, 0.3, and 0.3, respectively; the SAIFI becomes 0.9 by summing up 0.1, 0.2, 0.3, and 0.3 (i.e., 0.1+0.2+0.3+0.3).

Herein, if the element 1 is replaced with a new product (with the failure rate of 0), the failure rate of the element 1 becomes 0 and the SAIFI becomes 0.8 by summing up 0, 0.2, 0.3, and 0.3 (i.e., 0+0.2+0.3+0.3).

In this case, when the sensitivity of the SAIFI of the element 1 is calculated, the sensitivity of the SAIFI of the element 1 becomes 0.1 (=0.9−0.8).

As shown above, it can be found that the sensitivity of the element finally is same as the improved level of the reliability index depending on the maintenance action.

The fitness function of maintaining the substation in accordance with the present invention is used to calculate the value minimizing the reliability index after the maintenance of an element of the substation. In other words, when an optimal value to make the sum of the improved levels of the elements of the substation caused by a maintenance action is calculated, the reliability index after the maintenance action for the elements of the substation becomes minimized. By doing this, the optimal maintenance scenario for the elements of the substation is drawn.

As explained above, in the present invention, within the limit satisfying the cost limitations, the optimal solution which is the maximum sum of weighted values of sensitivity of the system reliability index by using the fitness function of maintaining the substation is drawn as the optimal maintenance scenario for the element of the substation.

Meanwhile, as the reliability indices used for the fitness function of maintaining the substation in accordance with the present invention, SAIFI, ENS, and CIC have been used but the present invention is not required to be limited to these. Types and number of system reliability indices used according to a characteristic of a site of the substation may be properly selected to be used.

In addition, there may be several methods of drawing the optimal solution with the fitness function of maintaining the substation in accordance with the present invention, and in accordance with one example embodiment, dynamic programming may be used to shorten the time of drawing the optimal solution and improve accuracy.

Next, the substation asset management apparatus schedules maintenance and estimates maintenance costs by element subject to maintenance at S160.

Since then, maintenance is executed by using the maintenance scenario by element subject to maintenance and the substation asset management apparatus updates a unique reliability model by element of the substation according to the result of performing the maintenance at S170.

Figure 3:
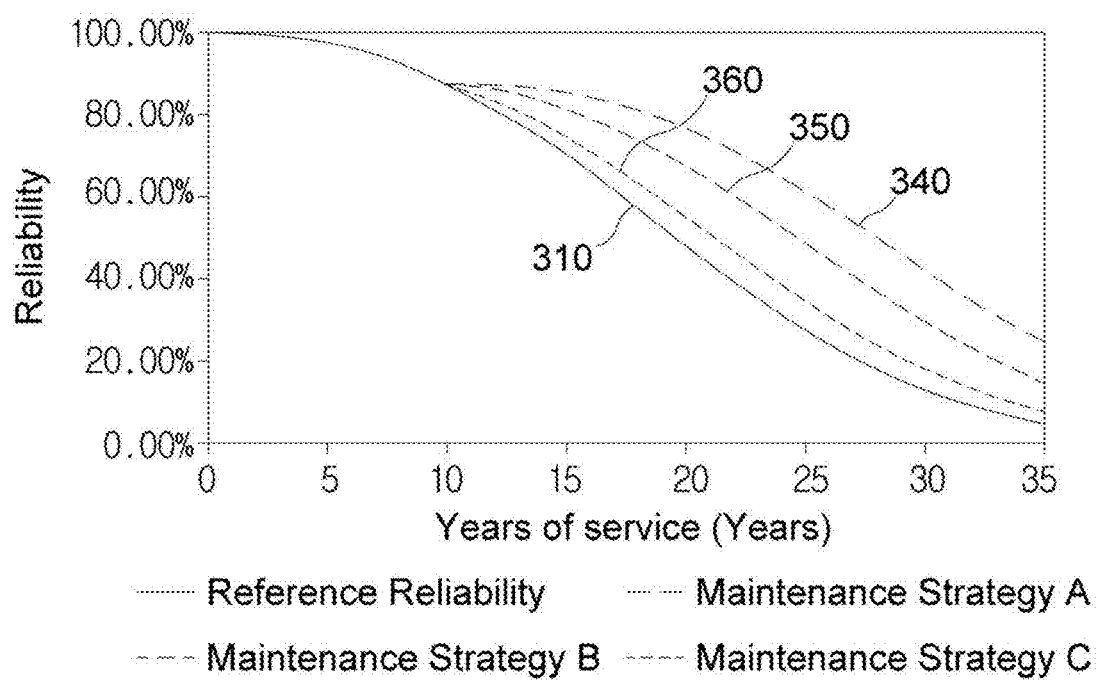
FIG. 3 is a drawing representing graphs to explain variation of reliability depending on a maintenance scenario by element of the substation in accordance with an example embodiment of the present invention.

FIG. 3 is a drawing representing graphs to explain variation of reliability according to a maintenance scenario by element of the substation in accordance with an example embodiment of the present invention.

In accordance with one example embodiment, a basis of improving reliability by a maintenance method may be set differently. It is possible to set 100% if a maintenance method is replacement of an element, 30% if it is precise inspection, and 15% if it is normal inspection. Depending on history of actual maintenance carried out, the reliability, additionally, may be differently set according to the maintenance under precise inspection and normal inspection.

In FIG. 3, it can be found that a maintenance strategy A, as a maintenance scenario including the replacement of the element, shows the width of improvement of the reliability is the greatest (in the graph 340) while a maintenance strategy B, as a precise inspection-centered maintenance scenario, shows the width of the improvement of the reliability is moderate (in the graph 350).

Meanwhile, it can be found that a maintenance strategy C, as a maintenance scenario to which normal inspection is applied, shows the width of the improvement of the reliability is the smallest (in the graph 360).

Next, by referring to FIGS. 4 through 6, detailed explanation on the detailed method of drawing the optimal maintenance scenario for the element of the substation will be made by using the fitness function of maintaining the substation based on the system reliability index in the present invention.

First, the system reliability before maintenance is as shown in Table 1 below.

TABLE 1

| Reliability Index | Value | Weighted Value w (scaling, 1000) |
| --- | --- | --- |
| SAIF1 | 3 | 333 |
| ENS | 1,200 | 5/6 |
| CIC | 40,000 | 1/40 |

At the time, the total budget for maintenance is 15. In other words, $c_{max}$ is 15.

FIG. 4 illustrates sensitivity by element and by reliability index and a maintenance cost by checkup type regarding the system.

At the time, the elements of the substation are composed of an element 1, an element 2, and an element 3. SAIFI, ENS, and CIC are applied as the system reliability indices to be used. Besides, checkup types of the elements are classified into four: maintenance of current state, normal inspection, precise inspection, and replacement.

Figure 5:
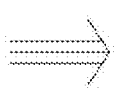

FIG. 5 shows a course of calculating improved levels of reliability indices by element and by checkup type by applying reliability index values and weighted values in Table 1 above for the sensitivity of the system by element and by reliability index and a maintenance cost by checkup type in FIG. 4 and also the calculated result values.

Herein, if the checkup type is maintenance of current state, it can be found that the improved level of the reliability index is 0 and the level gradually increases in order of normal inspection, precise inspection, and replacement.

Meanwhile, as explained above, the weighted value (w) is a weighted value for scaling a reliability index, but it could be properly adjusted in accordance with the example embodiment in a method of increasing the weighted value of the reliability index that should be handled importantly depending on a characteristic of a site of the substation.

FIG. 6 shows results of searching a combination whose improved level of each reliability index is maximized within cost limitations ($c_{max}$=15) for the improved level of each of the reliability indices by element and by checkup type in FIG. 5 by using dynamic programming.

As explained above, there could be several methods of drawing an optimal solution with a fitness function of maintaining the substation based on system reliability in accordance with the present invention. If the dynamic programming is used, the time of drawing the optimal solution may be reduced and the accuracy may be improved.

As seen in FIG. 6, it can be found that [Element 1=replacement, Element 2=normal inspection, Element 3=replacement] within the cost limitations ($c_{max}$=15), as an optimal solution of the fitness function of maintaining the substation in the present invention, is an optimal maintenance scenario with the improved level of the reliability index being the greatest.

Figure 7:
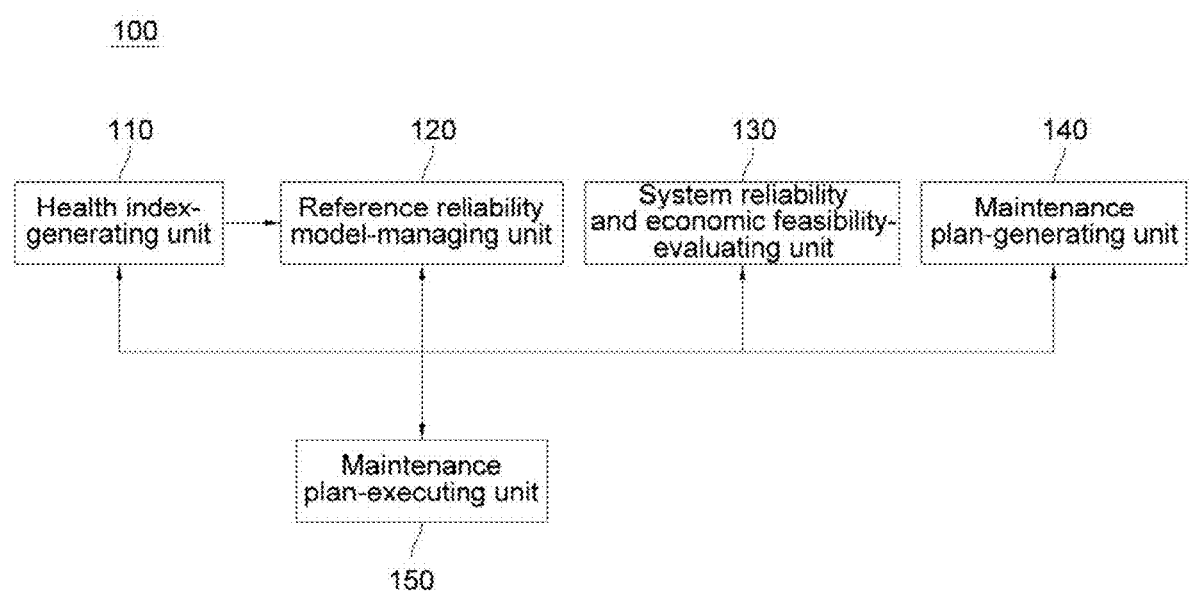
FIG. 7 is a configuration block diagram to explain a substation asset management apparatus in accordance with an example embodiment of the present invention.

FIG. 7 is a configuration block diagram to explain a substation asset management apparatus in accordance with an example embodiment of the present invention.

By referring to FIG. 7, the substation asset management apparatus in the present invention comprises a health index-generating unit 110, a reference reliability model-managing unit 120, a system reliability and economic feasibility-evaluating unit 130, a maintenance plan-generating unit 140, and a maintenance plan-executing unit 150.

The health index-generating unit 110 generates a health index by element of the substation by using status data and real-time monitoring data by element of the substation. At the time, the status data and the real-time monitoring data by element of the substation include online monitoring status data by element of the substation and offline monitoring status data and remote monitoring data by element of the substation. The offline monitoring status data may include at least one of data on installation and checkup history, failure history, operating environment and operating history by element of the substation.

In accordance with one example embodiment, the health index-generating unit 110 may generate total score of, and actions against, technical risks depending on an operating environment, insulation deterioration, an electrical risk, a thermal risk, a chemical risk, a mechanical risk, airtightness performance, insulation performance, interrupting performance, and current-carrying performance by element of the substation based on the status data and the real-time monitoring data by element of the substation.

As an example, the health index-generating unit 110 may generate total score of, and actions against, technical risks depending on an operating environment, insulation deterioration, an electrical risk, a thermal risk, and a chemical risk of a TR by using information on the reference reliability model of the TR.

As another example, the health index-generating unit 110 may generate total score of, and actions against, technical risks of a GIS depending on an operation history data, airtightness performance, insulation performance, interrupting performance, and current-carrying performance of the TR by using information on the reference reliability model of the GIS.

The reference reliability model-managing unit 120 generates a unique reliability model by element of the substation by determining and performing compensation of the reference reliability model by substation type based on the reference reliability model by substation type and the health index by element of the substation.

If the reliability by health index by element of the substation is identical to that of the reference reliability model by substation type, the reference reliability model-managing unit 120 determines that the currently used reference reliability model by substation type is the optimal reference reliability model and does not perform compensation for the reference reliability model by substation type.

In addition, if the reliability by the health index by element of the substation is different from that of the reference reliability model by substation type, the reference reliability model-managing unit 120 performs compensation for the reference reliability model by substation type fit for the reliability by health index by element of substation, thereby generating a unique reliability model by element of the substation.

In other words, if the reliability by the health index by element of the substation is different from that of the reference reliability model by substation type, the reference reliability model-managing unit 120 determines that the currently used reference reliability model by substation type is not the optimal reference reliability model, thereby executing compensation for the reference reliability model by substation type by using the health index by element of the substation to generate a unique reliability model by element of the substation.

As shown above, in the present invention, a unique reliability model by element of the substation may be optimized by compensating the reference reliability model by substation type by element of the substation, instead of continuously using the reference reliability model by substation type.

After selecting a candidate element subject to maintenance depending on a specified priority, the system reliability and economic feasibility-evaluating unit 130 performs system reliability and economic feasibility by maintenance scenario based on the pre-generated reference system reliability model of the candidate subject to maintenance.

In accordance with an example embodiment, the system reliability and economic feasibility-evaluating unit 130 may evaluate economic feasibility such as current value and future value while evaluating system reliability such as power outage costs, value of lost load, and sensitivity by element by applying failure rate, failure recovery time, load by loading point, repair costs, recovery costs, target maintenance costs, interest rate, equipment sensitivity, and parent-child relationships between the elements of the substation, etc. to the pre-generated reference system reliability model.

Based on the result of the system reliability and economic feasibility drawn, the maintenance plan-generating unit 140 draws an optimal scenario of elements of the substation by using the fitness function of maintaining the substation in the present invention. At the time, the optimal scenario of elements of the substation may allow only a maintenance scenario fit for cost limitations after being applied for the maintenance to be drawn.

As explained above, based on the system reliability index in accordance with the present invention, the fitness function of maintaining the substation is used to calculate the value minimizing the reliability index after maintenance of the element of the substation. It is to calculate the optimal solution to make the sum of the improved levels of the elements of the substation caused by a maintenance action become the maximum value to draw the optimal maintenance scenario of the element of the substation.

In other words, within the limit satisfying the cost limitations, the optimal solution which is the maximum sum of weighted values of sensitivity of the system reliability indices by using the fitness function of maintaining the substation is drawn as the optimal maintenance scenario of the elements of the substation.

As explained above, reliability indices used for the fitness function of maintaining the substation may include SAIFI, ENS, CIC, etc. but they are not required to be limited to these. The types and number of system reliability indices depending on a characteristic of a site of the substation may be properly selected to be used.

Meanwhile, as explained above, there may be several methods of drawing an optimal solution with a fitness function of maintaining the substation in accordance with the present invention, and in accordance with one example embodiment, dynamic programming may be used to shorten the time of drawing the optimal solution and improve accuracy.

The maintenance plan-executing unit 150 checks whether to perform maintenance and updates a unique reliability model by element of the substation while scheduling maintenance and estimating maintenance costs under the maintenance scenario by element of the substation drawn from the maintenance plan-generating unit 140.

As explained above, in accordance with the present invention, an optimal maintenance strategy for the elements of the substation may be drawn based on the reliability index of the power system, and the drawn optimal maintenance strategy may allow the stability of the elements to be secured while allowing the costs of substation asset management to be reduced.

As stated above, the present invention has been explained by limited example embodiments and drawings but the present invention is not limited to the aforementioned example embodiments. Various changes and modifications may be derived from those skilled in the art.

Accordingly, the invention must be identified by the claims of the present invention as described below and all variables and equivalents would appertain to the scope of the ideas of the present invention.

REFERENCE NUMERALS

100: Substation asset management apparatus
110: Health index-generating unit

120: Reference reliability model-managing unit
130: System reliability and economic feasibility-evaluating unit
140: Maintenance plan-generating unit
150: Maintenance plan-executing unit

INDUSTRIAL AVAILABILITY

The present invention relates to an asset management method and it is available in a field of maintenance of power systems.

What is claimed is:

1. A substation asset management method based on a reliability index in a power system, comprising the steps of:
   (a) determining whether to compensate a reliability model by elements of the substation by comparing reliability of a reference reliability model by a substation type with reliability depending on a health index by the elements thereof generated based on state data and real-time monitoring data by the elements of the substation;
   (b) compensating the reference reliability model by the substation type and generating a unique reliability model by the elements of the substation by using the health index as a result of the determination;
   (c) evaluating system reliability and economic feasibility by a maintenance scenario based on a pre-generated reference system reliability model for each candidate element subject to maintenance among the elements of the substation;
   (d) drawing the maintenance scenario of the elements of the substation by using a fitness function of maintaining the substation based on the result drawn through the evaluation of the system reliability and the economic feasibility; and
   (e) checking whether to perform the maintenance and scheduling the maintenance and estimating maintenance costs depending on the drawn maintenance scenario of the elements of the substation; and
   (f) updating the unique reliability model for each element of the substation according to a result of performing the scheduled maintenance,
   wherein the fitness function of maintaining the substation is based on system reliability indices, and
   wherein the fitness function of maintaining the substation includes sensitivities of at least two system reliability indices, and a sum of weighted values of the sensitivities of the at least two system reliability indices which becomes a maximum value is drawn as an optimal solution.

2. The method of claim 1, wherein the fitness function of maintaining the substation is made under the following equation:

$$\text{maximize}\left(w_1 \sum_{i,j} r_{ij} x_{ij} + w_2 \sum_{i,j} s_{ij} x_{ij} + w_3 \sum_{i,j} t_{ij} x_{ij}\right)$$

wherein w is a weighted value for scaling a reliability index; $x_{ij}$ is whether to adopt a j-th strategy for an i-th element; $r_{ij}$ is a sensitivity of a first reliability index of the j-th strategy for the i-th element; $s_{ij}$ is a sensitivity of a second reliability index of the j-th strategy for the i-th element; and $t_{ij}$ is a sensitivity of a third reliability index of the j-th strategy for the i-th element.

3. The method of claim 2, wherein the weighted value is adjusted depending on a characteristic of a site of the substation.

4. The method of claim 1, wherein, at the step (d), only the maintenance scenario fit for cost limitations after being applied for the maintenance is drawn.

5. The method of claim 1, wherein the sum of weighted values is drawn by using dynamic programming.

6. The method of claim 1, wherein, at the step (c), by applying at least one of failure rate, failure recovery time, load by loading point, repair costs, recovery costs, target maintenance costs, interest rate, equipment sensitivity, and parent-child relationships between the elements of the substation to the pre-generated reference system reliability model, while system reliability, including power outage costs, value of lost load, sensitivity by element, is evaluated, economic feasibility including current value and future value is evaluated.

7. The method of claim 1, wherein the step of (c) includes a step of selecting a candidate element subject to maintenance among the elements of the substation depending on prespecified priorities.

8. A substation asset management apparatus based on a reliability index in a power system, the apparatus comprising:
   a health index-generating processor for generating a health index by elements of the substation by using status data and real-time monitoring data by the elements of the substation;
   a reference reliability model-managing processor for determining whether to compensate a reference reliability model by a substation type and generating a unique reliability model by the elements of the substation based on the reference reliability model by the substation type and health index;
   a system reliability and economic feasibility-evaluating processor for evaluating system reliability and economic feasibility by a maintenance scenario based on a pre-generated reference system reliability model for each candidate element subject to maintenance selected according to prespecified priorities;
   a maintenance plan-generating processor for drawing the maintenance scenario of the elements of the substation by using a fitness function of maintaining the substation based on the evaluation of the system reliability and the economic feasibility; and
   a maintenance plan-executing processor for checking whether to perform the maintenance and scheduling the maintenance and estimating maintenance costs depending on the drawn maintenance scenario of the elements of the substation, and for updating the unique reliability model for each element of the substation according to a result of performing the scheduled maintenance;
   wherein the fitness function of maintaining the substation is based on system reliability indices, and
   wherein the fitness function of maintaining the substation includes sensitivities of at least two system reliability indices, and a sum of weighted values of the sensitivities of the at least two system reliability indices which becomes a maximum value is drawn as an optimal solution.

9. The apparatus of claim 8, wherein the fitness function of maintaining the substation is made under the following equation:

$$\text{maximize}\left(w_1\sum_{i,j} r_{ij}x_{ij} + w_2\sum_{i,j} s_{ij}x_{ij} + w_3\sum_{i,j} t_{ij}x_{ij}\right)$$

wherein w is a weighted value for scaling a reliability index; $x_{ij}$ is whether to adopt a j-th strategy for an i-th element; $r_{ij}$ is a sensitivity of a first reliability index of the j-th strategy for the i-th element; $s_{ij}$ is a sensitivity of a second reliability index of the j-th strategy for the i-th element; $t_{ij}$ is a sensitivity of a third reliability index of the j-th strategy for the i-th element.

10. The apparatus of claim 9, wherein the weighted value is adjusted depending on a characteristic of a site of the substation.

11. The apparatus of claim 8, wherein upon drawing the maintenance scenario of the elements of the substation by using the fitness function of maintaining the substation based on the evaluation of the system reliability and the economic feasibility, the maintenance plan-generating processor draws only the maintenance scenario fit for cost limitations after being applied for the maintenance.

12. The apparatus of claim 8, wherein the sum of weighted values is drawn by using dynamic programming.

* * * * *